United States Patent
Chung et al.

(10) Patent No.: US 10,815,601 B2
(45) Date of Patent: Oct. 27, 2020

(54) LAUNDRY TREATMENT APPARATUS

(71) Applicant: LG ELECTRONICS INC., Seoul (KR)

(72) Inventors: Bosun Chung, Seoul (KR); Atul Dhiman, Uttar Pradesh (IN); Sagar Lawhate, Uttar Pradesh (IN); Srinivas Ganeboina, Uttar Pradesh (IN); Pradeep Mullapudi, Uttar Pradesh (IN)

(73) Assignee: LG Electronics Inc., Seoul (KR)

( * ) Notice: Subject to any disclaimer, the term of this patent is extended or adjusted under 35 U.S.C. 154(b) by 246 days.

(21) Appl. No.: 15/813,540

(22) Filed: Nov. 15, 2017

(65) Prior Publication Data

US 2018/0135223 A1    May 17, 2018

(30) Foreign Application Priority Data

Nov. 15, 2016  (IN) .............................. 201631038974

(51) Int. Cl.
| | | |
|---|---|---|
| *D06F 37/24* | (2006.01) | |
| *F04D 13/06* | (2006.01) | |
| *D06F 39/08* | (2006.01) | |
| *F04D 1/00* | (2006.01) | |
| *F04D 29/66* | (2006.01) | |

(Continued)

(52) U.S. Cl.
CPC ............ *D06F 37/24* (2013.01); *D06F 39/085* (2013.01); *D06F 39/088* (2013.01); *F04D 1/00* (2013.01); *F04D 13/06* (2013.01); *F04D 29/669* (2013.01); *F16F 15/067* (2013.01); *D06F 37/20* (2013.01); *D06F 39/12* (2013.01)

(58) Field of Classification Search
CPC ........ D06F 37/20; D06F 37/24; D06F 39/085; D06F 39/088; F04D 29/668; F04D 29/669; F16F 15/067
See application file for complete search history.

(56) References Cited

U.S. PATENT DOCUMENTS 5,913,892 A  *  6/1999  Kwon ................... F16F 15/046
                                                         62/296
6,141,995 A  *  11/2000  Johnson ................ D06F 39/085
                                                         134/188

(Continued)

FOREIGN PATENT DOCUMENTS

EP          1887125         2/2008

OTHER PUBLICATIONS

IN Office Action in Indian Application No. 201631038, dated Oct. 15, 2019, 5 pages.

*Primary Examiner* — Joseph L. Perrin
(74) *Attorney, Agent, or Firm* — Fish & Richardson P.C.

(57) ABSTRACT

Disclosed is a laundry treatment apparatus including a cabinet, a tub provided inside the cabinet for providing a space for storage of water, a drum rotatably provided inside the tub for providing a space for storage of laundry, a first water drain pipe for communicating with an inside of the tub, a second water drain pipe for communicating with an outside of the cabinet, a pump for moving water, introduced into the first water drain pipe, to the second water drain pipe, and a damper having one end fixed to a side surface of the pump that is defined as a space between a lowermost end of the pump and an uppermost end of the pump and an opposite end fixed to a cabinet bottom surface for attenuating vibrations generated in the pump.

12 Claims, 3 Drawing Sheets

(51) Int. Cl.
*F16F 15/067* (2006.01)
*D06F 37/20* (2006.01)
*D06F 39/12* (2006.01)

(56) References Cited

U.S. PATENT DOCUMENTS

| | | | |
|---|---|---|---|
| 6,478,555 B1* | 11/2002 | Kim | F04D 13/021 |
| | | | 417/420 |
| 2004/0173426 A1* | 9/2004 | Athanasiou | F16F 3/04 |
| | | | 188/378 |
| 2005/0196294 A1* | 9/2005 | Clark | F04B 53/003 |
| | | | 417/360 |
| 2006/0000240 A1* | 1/2006 | Song | D06F 39/085 |
| | | | 68/3 R |
| 2009/0301142 A1* | 12/2009 | Marioni | D06F 33/02 |
| | | | 68/131 |
| 2010/0095713 A1* | 4/2010 | Yim | D06F 37/20 |
| | | | 68/19 |
| 2011/0154676 A1* | 6/2011 | Castiglione | D06F 58/206 |
| | | | 34/86 |
| 2012/0161594 A1 | 6/2012 | Kim et al. | |
| 2012/0167931 A1* | 7/2012 | Park | A47L 15/4223 |
| | | | 134/186 |
| 2015/0020554 A1 | 1/2015 | Kim et al. | |
| 2017/0101733 A1* | 4/2017 | Jung | D06F 39/085 |
| 2017/0101734 A1* | 4/2017 | Jung | D06B 1/02 |
| 2018/0023240 A1* | 1/2018 | Xu | D06F 39/08 |
| | | | 248/636 |

* cited by examiner

LAUNDRY TREATMENT APPARATUS

CROSS-REFERENCE TO RELATED APPLICATIONS

This application claims the benefit of the Indian Patent Application No. 201631038974, filed on Nov. 15, 2016, which is hereby incorporated by reference as if fully set forth herein.

BACKGROUND OF THE INVENTION

Field of the Invention

The present invention relates to a laundry treatment apparatus.

Discussion of the Related Art

Generally, a laundry treatment apparatus is a generic term for an apparatus that washes laundry, an apparatus that dries laundry, and an apparatus that may perform both washing and drying of laundry.

A conventional laundry treatment apparatus includes a cabinet, a tub provided inside the cabinet for storing water therein, a drum rotatably provided inside the tub for storing laundry therein, a water supply unit for supplying water to the tub, and a pump for discharging the water, stored in the tub, to the outside of the cabinet.

In the conventional laundry treatment apparatus, a pump is fixed to the cabinet via a damper that is formed of, e.g. rubber. When the pump is fixed to the cabinet using the rubber damper, the following problems may occur.

First, because the conventional damper has one end fixed to the cabinet and an opposite end configured to support the bottom surface of the pump (i.e. the lowermost end of the pump), it is difficult to control the amplitude of vibration of the pump. That is, when the damper is provided to connect the bottom surface of the pump and the cabinet to each other, the center of gravity of the pump is located above the damper, which disadvantageously increases the amplitude of vibration in the vertical direction and the horizontal direction when the pump operates.

In addition, the rubber damper may absorb vibrations generated in the pump, but may be deformed so as to absorb external force only when the external force is relatively great. Therefore, the rubber damper may not absorb external force when small vibrations are generated in the pump. Accordingly, when vibrations generated in the pump are not great and small external force is input to the rubber damper, the rubber portion of the damper connected to the cabinet may transfer vibrations generated in the damper to the cabinet.

SUMMARY OF THE INVENTION

Accordingly, the present invention is directed to a laundry treatment apparatus that substantially obviates one or more in problems due to limitations and disadvantages of the related art.

One object of the present invention is to provide a laundry treatment apparatus, which may minimize the amplitude of vibration of a pump.

In addition, another object of the present invention is to provide a laundry treatment apparatus, which may minimize the transfer of vibrations generated in a pump to a cabinet.

Additional advantages, objects, and features will be set forth in part in the description which follows and in part will become apparent to those having ordinary skill in the art upon examination of the following or may be learned from practice. The objectives and other advantages may be realized and attained by the structure particularly pointed out in the written description and claims hereof as well as the appended drawings.

To achieve these objects and other advantages and in accordance with the purpose of the invention, as embodied and broadly described herein, in accordance with an aspect of the present invention, a laundry treatment apparatus includes a cabinet, a tub provided inside the cabinet for providing a space for storage of water, a drum rotatably provided inside the tub for providing a space for storage of laundry, a first water drain pipe for communicating with an inside of the tub, a second water drain pipe for communicating with an outside of the cabinet, a pump for moving water, introduced into the first water drain pipe, to the second water drain pipe, and a damper having one end fixed to a side surface of the pump that is defined as a space between a lowermost end of the pump and an uppermost end of the pump and an opposite end fixed to a cabinet bottom surface for attenuating vibrations generated in the pump.

The pump may include a first housing having a first chamber for providing a space in which an impeller is accommodated, an inlet port for connecting the first chamber and the first water drain pipe to each other, and an outlet port for connecting the first chamber and the second water drain pipe to each other, a second housing fixed to the first housing, a second chamber provided in the second housing and separated from the first chamber by a partition, a rotating shaft rotatably provided in the second chamber, the rotating shaft having one end penetrating the partition to thereby be connected to the impeller, and a drive unit fixed to the second housing so as to be located outside the second chamber for rotating the rotating shaft, and the damper may be provided so as to connect a side surface of the second housing, located between a lowermost end of the second housing and an uppermost end of the second housing, and the cabinet bottom surface to each other.

The laundry treatment apparatus may further include a support body located on a rear surface of the second housing, and a first arm and a second arm configured to extend from both ends of the support body toward a direction in which the impeller is located so as to be fixed respectively to opposite side surfaces of the second housing, and the damper may include a first spring for connecting the cabinet bottom surface and the first arm to each other, a second spring for connecting the cabinet bottom surface and the second arm to each other, and a third spring for connecting the cabinet bottom surface and the support body to each other.

The first spring, the second spring, and the third spring may provide repulsive force against compressive force.

The damper may further include a fourth spring for connecting the cabinet bottom surface and the support body to each other, the fourth spring being spaced apart from the third spring.

The laundry treatment apparatus may further include a first fixing portion protruding from the first arm toward the cabinet bottom surface so that one end of the first spring is fixed thereto, a first fastening member separably fixed on the cabinet bottom surface so that a remaining end of the first spring is fixed thereto, a second fixing portion protruding from the second arm toward the cabinet bottom surface so that one end of the second spring is fixed thereto, a second fastening member separably fixed on the cabinet bottom surface so that a remaining end of the second spring is fixed thereto, a third fixing portion protruding from the support body toward the cabinet bottom surface so that one end of the third spring is fixed thereto, and a third fastening member separably fixed on the cabinet bottom surface so that a remaining end of the third spring is fixed thereto.

The laundry treatment apparatus may further include a first protrusion protruding from the first arm toward the second housing, a second protrusion protruding from the second arm toward the second housing, a first slot formed by concavely bending an outer circumferential surface of the second housing for insertion of the first protrusion, and a second slot formed by concavely bending the outer circumferential surface of the second housing for insertion of the second protrusion.

The first slot may be provided to extend from a rear surface of the second housing toward a front surface of the second housing so as to provide a movement path of the first protrusion, and the second slot may be provided to extend from the rear surface of the second housing toward the front surface of the second housing so as to provide a movement path of the second protrusion.

The first arm and the second arm may be located higher above the cabinet bottom surface than a center of gravity of the pump.

The drive unit may include a permanent magnet fixed to the rotating shaft so as to be located in the second chamber, and a stator fixed to the second housing so as to be located outside the second chamber to form a rotational magnetic field.

The stator may include a first core and a second core spaced apart from each other with the second chamber interposed therebetween, the first core and the second core being formed as conductors, a first coil wound around the first core and located higher above the cabinet bottom surface than the second chamber, and a second coil wound around the second core and located higher above the cabinet bottom surface than the second chamber.

The laundry treatment apparatus may further include a third chamber provided in the second housing so as to be located above the second chamber for providing a space in which a region of the first core, around which the first coil is wound, and a region of the second core, around which the second coil is wound, are accommodated, and a fourth chamber provided in the second housing so as to surround the second chamber, the fourth chamber communicating with the third chamber and providing a space in which the first core and the second core are accommodated, and the first arm and the second arm may be separably coupled to an outer circumferential surface of the third chamber or an outer circumferential surface of the fourth chamber.

The laundry treatment apparatus may further include a first terminal fixed to the third chamber so that the first coil is connected thereto, a second terminal fixed to the third chamber so that the second coil is connected thereto, and a cover separably fixed to the first arm and the second arm and located above the first terminal and the second terminal.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings.

DETAILED DESCRIPTION OF THE INVENTION

Figure 1:
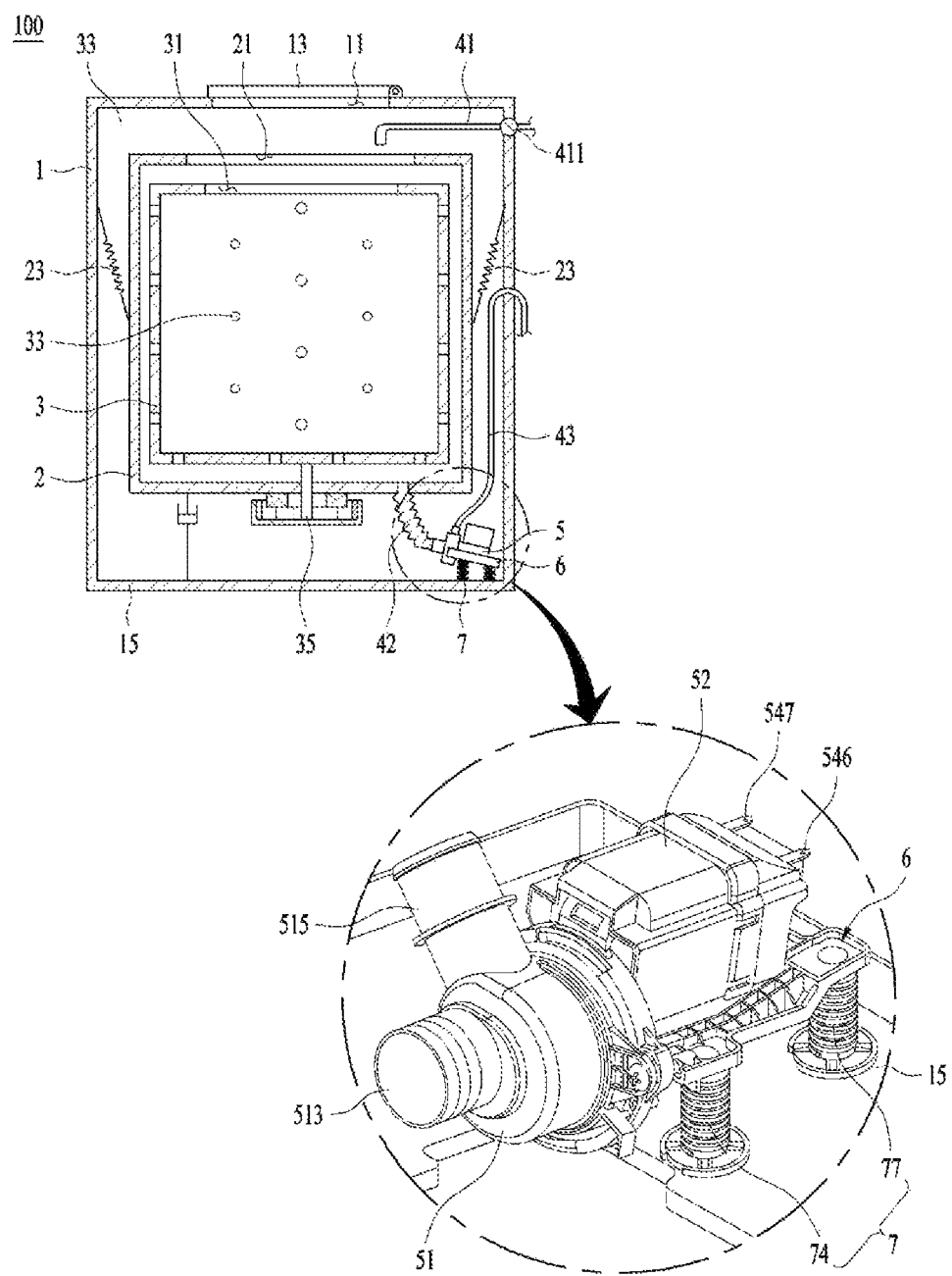
FIG. 1 illustrates an example of a laundry treatment apparatus according to the present invention.

Hereinafter, exemplary embodiments of the present invention will be described in detail with reference to the accompanying drawings. Meanwhile, the configuration of an apparatus or a control method of the apparatus, which will be described below, is merely given to describe the embodiments of the present invention, without being intended to limit the scope of the present invention. The same reference numerals used throughout the specification refer to the same constituent elements.

A laundry treatment apparatus of the present invention, designated by reference numeral 100, includes a cabinet 1, a tub 2 provided inside the cabinet 1 for storing water therein, and a drum 3 rotatably provided inside the tub 2 for storing laundry therein.

The cabinet 1 may be provided in the upper surface thereof with an opening 11, through which laundry is introduced into the drum 3 or the laundry stored in the drum 3 is discharged outward. The opening 11 may be opened or closed by a door 13.

The tub 2 is fixed inside the cabinet 1 via a tub support 23. The tub 2 may include a tub opening 21 that communicates with the opening 11. The tub support 23 may have a structure for absorbing vibrations generated in the tub 2.

The drum 3 is provided so as to be rotated inside the tub 2 by a motor 35. The drum 3 includes a drum opening 31 located below the tub opening 21 so as to communicate with the opening 11, and through-holes 33 formed in the drum 3 so as to communicate the inside of the drum 3 with the inside of the tub 2.

The tub 2 receives water via a water supply unit, and the water stored in the tub 2 is discharged to the outside of the cabinet 1 via a water drain unit.

The water supply unit may include a water supply pipe 41 connected to a water source and a valve 411 for opening or closing the water supply pipe 41.

The water drain unit may include a first water drain pipe 42 that communicates with the tub 2, a second water drain pipe 43 that communicates with the outside of the cabinet 1, and a pump 5 for moving water introduced into the first water drain pipe 42 to the second water drain pipe 43.

In a conventional laundry treatment apparatus, a pump is fixed on a cabinet bottom surface 15 via a rubber damper. Although the rubber damper, which supports the pump, is useful in preventing vibrations generated in the pump from being transferred to the cabinet 1, fixing the pump to the cabinet 1 using the rubber damper may cause the following problems.

First, because the conventional damper has one end fixed to the cabinet bottom surface and an opposite end configured to support the bottom surface of the pump (i.e. the lowermost end of the pump), it is difficult to control the amplitude of vibration of the pump. That is, when the damper is provided to connect the bottom surface of the pump and the cabinet bottom surface to each other, the center of gravity of the pump is located above the damper, which disadvantageously increases the amplitude of vibration in the vertical direction and the horizontal direction when the pump operates.

In addition, the rubber damper may absorb vibrations generated in the pump, but may be deformed so as to absorb external force only when the external force is relatively great. Therefore, the rubber damper may not be deformed when small external force is input. Accordingly, when vibrations generated in the pump are not great and small external force is input to the rubber damper, the rubber portion of the damper connected to the cabinet may transfer vibrations generated in the damper to the cabinet.

To solve the problems described above, the laundry treatment apparatus 100 of the present invention includes a damper 7 having one end fixed to the side surface of the pump 5 and an opposite end fixed to the cabinet bottom surface 15 so as to alleviate vibrations generated in the pump 5. The side surface of the pump 5 is defined as the space between the lowermost end of the pump 5 and the uppermost end of the pump 5.

Figure 2:
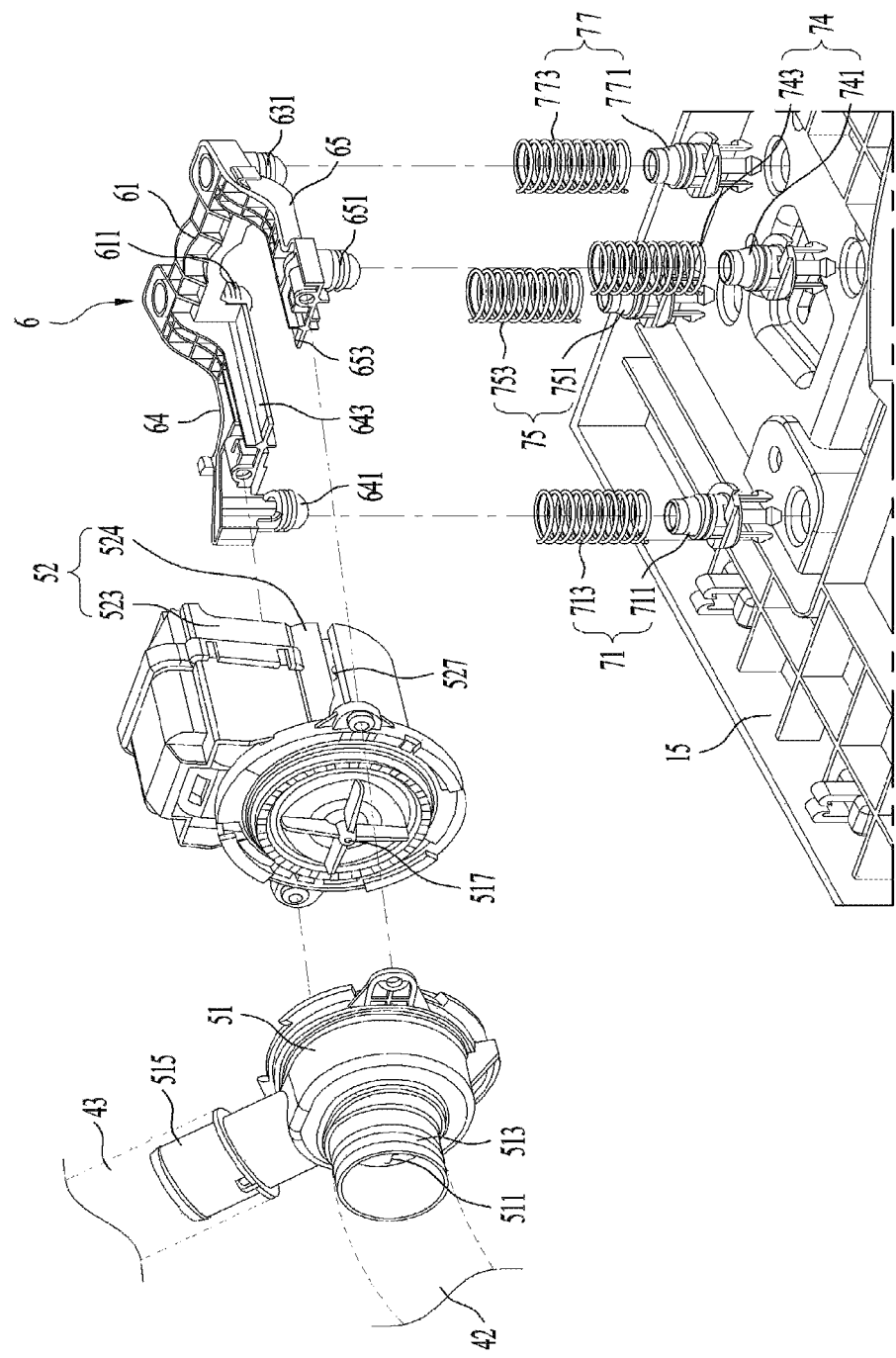
FIGS. 2 and 3 illustrate an example of a pump, a support unit, and a damper according to the present invention.

As illustrated in FIG. 2, the pump 5 may include a first housing 51 having a first chamber 511, a second housing 52 to which the first housing 51 is fixed, an impeller 517 accommodated in the first chamber 511, and a drive unit provided in the second housing 52 for rotating the impeller 517.

The first housing 51 is provided with an inlet port 513 for connecting the first water drain pipe 42 to the first chamber 511 and an outlet port 515 for connecting the second water drain pipe 43 to the first chamber 511. As such, when the impeller 517 is rotated, water introduced into the inlet port 513 may move to the second water drain pipe 43 through the outlet port 515.

Figure 3:
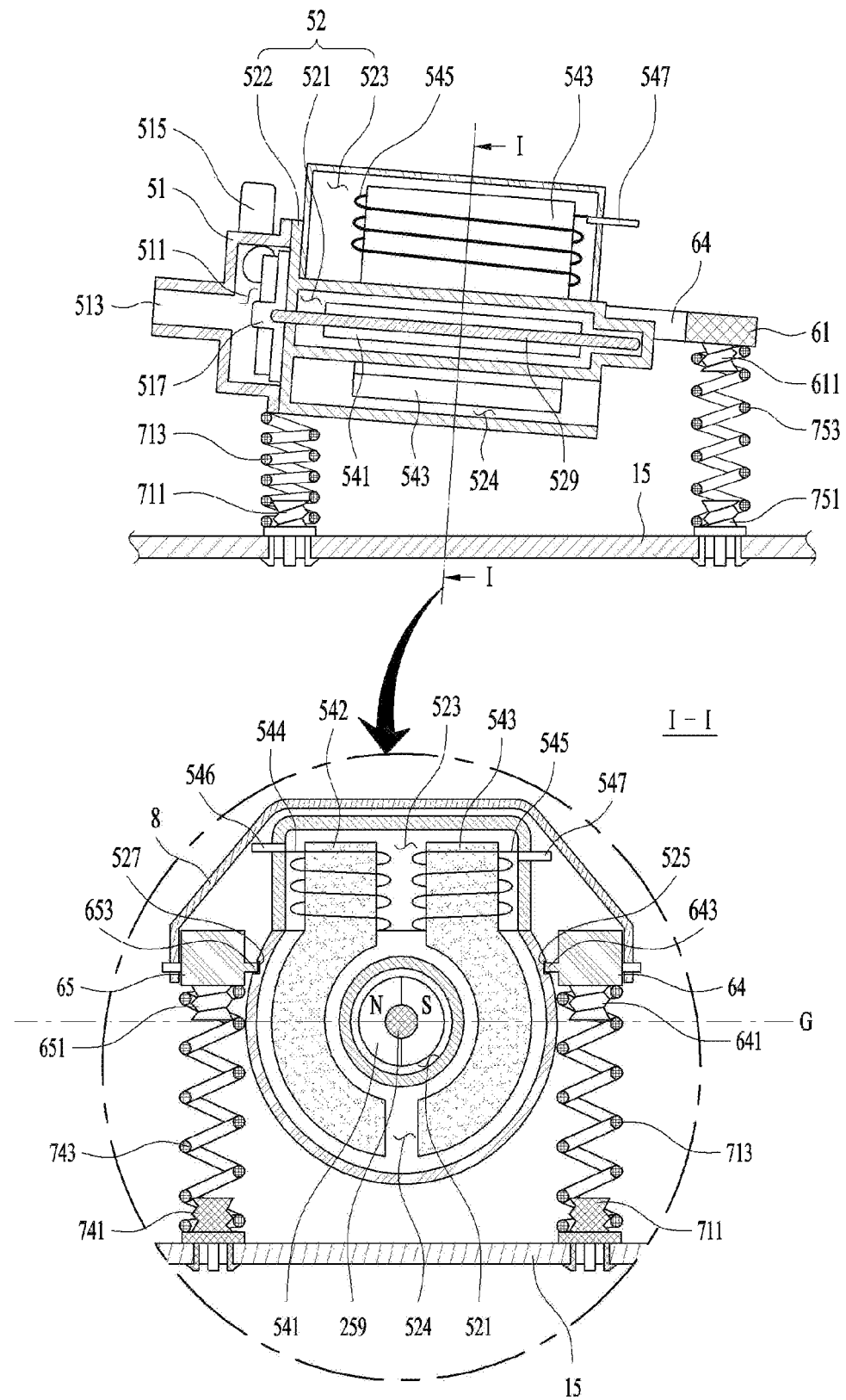

As illustrated in FIG. 3, the second housing 52 includes a second chamber 521 separated from the first chamber 511 via a partition 522, and a third chamber 523 separably fixed to the second housing 52 or separably fixed to the second chamber 521 so as to be located above the second chamber 521.

A rotating shaft 529 is accommodated in the second chamber 521 and penetrates the partition 522 to thereby be connected to the impeller 517. In this case, the drive unit may include a permanent magnet 541 fixed to the circumferential surface of the rotating shaft 529 so as to be located in the second chamber 521, and a stator provided in the third chamber 523 to form a rotational magnetic field for rotating the permanent magnet 541.

The stator includes a first core 542 and a second core 543, which are formed of a metal and are spaced apart from each other with the second chamber 521 interposed therebetween, a first coil 544 wound around the first core 542, and a second coil 545 wound around the second core 543.

The first core 542 and the second core 543 may have any of various shapes so long as they may form a rotational magnetic field around the permanent magnet 541. FIG. 3 illustrates an example in which the first core 542 is a metal plate that extends from the left upper portion to the left lower portion of the second chamber 521, and the second core 543 is a metal plate that extends from the right upper portion to the right lower portion of the second chamber 521.

In this case, because the upper end of the first core 542 and the upper end of the second core 543 are located in the third chamber 523, the upper end of the first core 542 and the upper end of the second core 543 are located higher above the cabinet bottom surface 15 than the second chamber 521.

The first coil 544 and the second coil 545 are wound respectively around the upper end of the first core 542 and the upper end of the second core 543, and thus are located in the third chamber 523. The third chamber 523 may further include a first terminal 546 to which the first coil 544 is fixed and a second terminal 547 to which the second coil 545 is fixed.

The lower end of the first core 542 (i.e. the region around which no first coil is wound) and the lower end of the second core 543 (i.e. the region around which no second coil is wound) may be located on the lower end of the second chamber 521. In order to prevent the lower end of the first core 542 and the lower end of the second core 543 from being exposed to the outside, the second housing 52 may further include a fourth chamber 524.

The fourth chamber 524 is provided to surround the second chamber 521 and is located below the third chamber 523. The third chamber 523 and the fourth chamber 524 are provided to communicate with each other and provide the space in which the first core 542 and the second core 543 are accommodated.

The damper 7 may be provided to connect the side surface of the pump 5 and the cabinet bottom surface 15 to each other, or may be provided to connect a support unit 6, which is separably coupled to the pump 5 as illustrated in FIG. 2, and the cabinet bottom surface 15 to each other.

As illustrated in FIG. 2, the support unit 6 includes a support body 61 located on the rear surface of the pump 5, a first arm 64 extending from one end of the support body 61 toward the front surface of the pump 5 (i.e. toward the impeller 517), and a second arm 65 extending from an opposite end of the support body 61 toward the front surface of the pump 5.

The first arm 64 and the second arm 65 are separably coupled to the second housing 52. The first arm 64 and the second arm 65 may be fixed respectively to opposite side surfaces of the second housing 52, which are defined as the space between the lowermost end of the second housing 52 and the uppermost end of the second housing 52. When the first arm 64 and the second arm 65 are provided on the side surfaces of the second housing 52, the amplitude of vibration of the pump 5 may be minimized compared to the case where the damper 7 is provided to connect the bottom surface of the pump 5 and the cabinet bottom surface 15 to each other.

As one solution to minimize vibrations generated in the pump 5, the first arm 64 and the second arm 65 may be separably coupled to the second housing 52, and may be located higher above the cabinet bottom surface 15 than the center of gravity (G, see FIG. 3) of the pump 5. In the present invention, the amplitude of vibration of the pump 5 may be minimized even when the center of gravity G of the pump 5 is located lower than the first arm 64 and the second arm 65.

The first arm 64 and the second arm 65 may be fixed to the second housing 52 via the outer circumferential surface of the fourth chamber 524, or may be fixed to the second housing 52 via the outer circumferential surface of the third chamber 523. When the first arm 64 and the second arm 65 are fixed to the second housing 52 via the outer circumferential surface of the third chamber 523, vibrations of the pump 5 may be more reduced than that when the first arm 64 and the second arm 65 are fixed to the second housing 52 via the outer circumferential surface of the fourth chamber 524.

FIG. 2 illustrates an example in which the arms 64 and 65 and the second housing 52 are coupled to each other via the outer circumferential surface of the fourth chamber 524. In this case, the first arm 64 is provided with a first protrusion 643, which protrudes from the first arm 64 toward the second housing 52, and the second arm 65 is provided with a second protrusion 653, which protrudes from the second arm 65 toward the second housing 52. A first slot 525 and a second slot 527 for insertion of the first protrusion 643 and the second protrusion 653 are formed in the outer circumferential surface of the fourth chamber 524. The first slot 525 and the second slot 527 may be formed by concavely bending the outer circumferential surface of the fourth chamber 524.

In addition, the first slot 525 and the second slot 527 may extend from the rear surface of the pump 5 toward the front surface of the pump 5 so as to provide movement paths of the respective protrusions 643 and 653 when the pump 5 and the support unit 6 are coupled to each other.

The damper 7, which fixes the support unit 6 to the cabinet bottom surface 15, may include a first damper 71 for fixing the first arm 64 to the cabinet bottom surface 15, a second damper 74 for fixing the second arm 65 to the cabinet bottom surface 15, and a third damper 75 for fixing the support body 61 to the cabinet bottom surface 15.

As mentioned above, when each damper is formed of rubber, the damper may not absorb small vibrations generated in the pump 5 and may transfer the vibrations to the cabinet 1. Therefore, the first damper 71, the second damper 74, and the third damper 75 may include springs for providing repulsive force corresponding to compressive force.

That is, the first damper 71 may include a first spring 713 for fixing the first arm 64 to the cabinet bottom surface 15, the second damper 74 may include a second spring 743 for fixing the second arm 65 to the cabinet bottom surface 15, and the third damper 75 may include a third spring 753 for connecting the support body 61 and the cabinet bottom surface 15 to each other. Accordingly, the present invention may prevent small vibrations generated in the pump 5 from being transferred to the cabinet 1.

The pump 5 may be inclined upward from the rear surface thereof toward the impeller 517. That is, the height from the cabinet bottom surface 15 to the front surface of the pump 5 may be greater than the height from the cabinet bottom surface 15 to the rear surface of the pump 5.

When the pump 5 is inclined upward from the rear surface to the front surface thereof, the distance between the surface of the water in the first chamber 511 and the outlet port 515 is reduced compared to the case where the pump 5 is horizontally oriented so as to be parallel to the cabinet bottom surface 15. This may allow the water in the first chamber 511 to more easily move to the outlet port 515.

In this case, because the center of gravity of the pump 5 might move toward the rear surface of the pump 5, the damper 7 may further include a fourth damper 77 for connecting the support body 61 and the cabinet bottom surface 15 to each other. The fourth damper 77 may include a fourth spring 773, which connects the support body 61 and the cabinet bottom surface 15 to each other and is spaced apart from the third spring 753. The first spring, the second spring, the third spring, and the fourth spring may be springs that provide repulsive force against compressive force.

In order to allow the pump 5 to be inclined upward from the rear surface to the front surface thereof, the first arm 64 and the second arm 65 may be inclined upward from the support body 61 toward the front surface of the pump 5, the first damper 71 and the second damper 74 may be longer than the third damper 75 and the fourth damper 77, or the cabinet bottom surface 15 may have portions having different heights.

One end of the first spring 713 may be fixed to a first fastening member 711, which is separably provided on the cabinet bottom surface 15, and an opposite end of the first spring 713 may be fixed to a first fixing portion 641 provided on the first arm 64.

The first fixing portion 641 may protrude from the first arm 64 toward the cabinet bottom surface 15.

The first fastening member 711 may have any of various shapes so long as it is separable from the cabinet bottom surface 15. FIG. 2 illustrates an example in which the first fastening member 711 includes a fastening-member body, a spring-coupling body provided on the fastening-member body so as to be coupled to the first spring 713, and a hook provided on the fastening-member body so as to be inserted into a cabinet through-hole formed in the cabinet bottom surface 15.

One end of the second spring 743 may be fixed to a second fastening member 741, which is separably provided on the cabinet bottom surface 15, and an opposite end of the second spring 743 may be fixed to a second fixing portion 651 provided on the second arm 65.

The third spring 753 may support the support body 61 via a third fastening member 751 separably provided on the cabinet bottom surface 15 and a third fixing portion 611 provided on the support body 61, and a fourth spring 773 may support the support body 61 via a fourth fastening member 771 separably provided on the cabinet bottom surface 15 and a fourth fixing portion 613 provided on the support body 61.

The second fastening member 741, the third fastening member 751, and the fourth fastening member 771 may have the same structure as that of the above-described first fastening member 711.

The pump 5 having the structure described above, however, has the risk of causing water to be directed to the first terminal 546 or the second terminal 547 when the water inside the tub 2 or the water moving through the water supply pipe 41 leaks into the cabinet 1.

To eliminate this risk, the present invention may further include a cover 8 located above the first terminal 546 and the second terminal 547.

The cover 8 is separably fixed to the pump 5 or the support unit 6 so as to cover the first terminal 546 and the second terminal 547. FIG. 3 illustrates an example in which the cover 8 is separably coupled to the first arm 64 and the second arm 65 in order to prevent water from being directed to the first terminal 546 and the second terminal 547.

As is apparent from the above description, according to the present invention, a laundry treatment apparatus may minimize the amplitude of vibration of a pump.

In addition, the laundry treatment apparatus may minimize the transfer of vibrations generated in a pump to a cabinet.

Although the exemplary embodiments have been illustrated and described as above, of course, it will be apparent to those skilled in the art that the embodiments are provided to assist understanding of the present invention and the present invention is not limited to the above described particular embodiments, and various modifications and variations can be made in the present invention without departing from the spirit or scope of the present invention, and the modifications and variations should not be understood individually from the viewpoint or scope of the present invention.

What is claimed is:

1. A laundry treatment apparatus comprising:
a cabinet;

a tub provided inside the cabinet and configured to store water;

a drum rotatably provided inside the tub and configured to receive laundry;

a first water drain pipe in fluid communication with an interior of the tub and configured to drain water stored in the tub;

a second water drain pipe in fluid communication with an exterior of the cabinet;

a pump in fluid communication with the first water drain pipe and the second water drain pipe, and configured to receive water from the first water drain pipe and pump the received water to the second water drain pipe; and a damper configured to attenuate vibrations generated by the pump, the damper comprising a first end and a second end, wherein the first end of the damper is coupled to a side surface of the pump, and the second end of the damper is coupled to a bottom surface of the cabinet, wherein the pump comprises:
a first housing comprising:
a first chamber configured to accommodate an impeller;
an inlet port in fluid communication with the first chamber and configured to couple to the first water drain pipe; and
an outlet port in fluid communication with the first chamber and configured to couple to the second water drain pipe;
a second housing fixed to the first housing and comprising a side surface that provides the side surface of the pump;
a second chamber provided in the second housing and separated from the first chamber by a partition;
a rotating shaft rotatably provided in the second chamber and coupled to the impeller through a hole provided on the partition; and
a drive unit fixed to the second housing and located outside of the second chamber, the drive unit configured to rotate the rotating shaft,
wherein the first end of the damper is coupled to the side surface of the second housing,
wherein the laundry treatment apparatus further comprises:
a support body located on a rear surface of the second housing; and
a first arm and a second arm located at opposite ends of the support body and extending toward the impeller, the first arm and second arm configured to couple to opposite side surfaces of the second housing, and
wherein the damper further comprises:
a first spring configured to elastically couple the first arm to the bottom surface of the cabinet;
a second spring configured to elastically couple the second arm to the bottom surface of the cabinet; and
a third spring configured to elastically couple the support body to the bottom surface of the cabinet.

2. The laundry treatment apparatus according to claim 1, wherein the first spring, the second spring, and the third spring provide repulsive forces in response to compressive forces.

3. The laundry treatment apparatus according to claim 1, wherein the damper further comprises a fourth spring separated from the third spring and configured to elastically couple the support body to the bottom surface of the cabinet.

4. The laundry treatment apparatus according to claim 1, further comprising:

a first fixing portion protruding from the first arm toward the bottom surface of the cabinet and configured to fix a first end of the first spring;

a first fastening member separably fixed to the bottom surface of the cabinet and configured to fix a second end of the first spring;

a second fixing portion protruding from the second arm toward the bottom surface of the cabinet and configured to fix a first end of the second spring;

a second fastening member separably fixed to the bottom surface of the cabinet and configured to fix a second end of the second spring;

a third fixing portion protruding from the support body toward the bottom surface of the cabinet and configured to fix a first end of the third spring; and a third fastening member separably fixed to the bottom surface of the cabinet and configured to fix a second end of the third spring.

5. The laundry treatment apparatus according to claim 1, further comprising:

a first protrusion protruding from the first arm toward the second housing;

a second protrusion protruding from the second arm toward the second housing;

a first slot having a concave shape, the first slot provided on an outer circumferential surface of the second housing and configured to receive the first protrusion; and a second slot having a concave shape, the second slot provided on the outer circumferential surface of the second housing and configured to receive the second protrusion.

6. The laundry treatment apparatus according to claim 5, wherein the first slot extends from the rear surface of the second housing toward a front surface of the second housing and is configured to define a movement path for the first protrusion, and wherein the second slot extends from the rear surface of the second housing toward the front surface of the second housing and is configured to define a movement path for the second protrusion.

7. The laundry treatment apparatus according to claim 1, wherein the first arm and the second arm are located above a center of gravity of the pump.

8. The laundry treatment apparatus according to claim 1, wherein the drive unit comprises:

a permanent magnet fixed to the rotating shaft and located in the second chamber; and a stator fixed to the second housing, located outside of the second chamber, and configured to generate a rotational magnetic field.

9. The laundry treatment apparatus according to claim 8, wherein the stator comprises:

a first core and a second core spaced apart from each other and configured to surround a portion of the second chamber;

a first coil wound around a first portion of the first core, the first coil being located at a first position above the bottom surface of the cabinet that is higher than a vertical position of the second chamber above the bottom surface of the cabinet; and a second coil wound around a second portion of the second core, the second coil being located at a second position above the bottom surface of the cabinet that is higher than the vertical position of the second chamber.

10. The laundry treatment apparatus according to claim 9, wherein the first and second cores include a conductive material.

11. The laundry treatment apparatus according to claim 9, further comprising:
- a third chamber provided in the second housing and located above the second chamber, the third chamber configured to accommodate the first portion of the first core and the second portion of the second core; and
- a fourth chamber in communication with the third chamber and provided in the second housing, the fourth chamber configured to surround the second chamber and to accommodate the first core and the second core,
- wherein the first arm and the second arm are separably coupled to an outer circumferential surface of the third chamber or an outer circumferential surface of the fourth chamber.

12. The laundry treatment apparatus according to claim 11, further comprising:
- a first terminal fixed to the third chamber and electrically coupled to the first coil;
- a second terminal fixed to the third chamber and electrically coupled to the second coil; and
- a cover separably fixed to the first arm and the second arm, and configured to shield the first terminal and second terminal from water.

* * * * *